United States Patent
Nomura et al.

(10) Patent No.: US 9,969,269 B2
(45) Date of Patent: May 15, 2018

(54) HYBRID VEHICLE AND CONTROL METHOD OF HYBRID VEHICLE

(71) Applicant: Toyota Jidosha Kabushiki Kaisha, Toyota-shi, Aichi-ken (JP)

(72) Inventors: Atsushi Nomura, Toyota (JP); Tomoko Oba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/444,670

(22) Filed: Feb. 28, 2017

(65) Prior Publication Data

US 2017/0259668 A1 Sep. 14, 2017

(30) Foreign Application Priority Data

Mar. 9, 2016 (JP) .................................. 2016-045483

(51) Int. Cl.
*B60L 3/00* (2006.01)
*B60K 6/40* (2007.10)
*B60K 28/10* (2006.01)
*B60W 20/00* (2016.01)
*H02P 27/06* (2006.01)
*H02P 29/024* (2016.01)
*B60K 6/46* (2007.10)

(52) U.S. Cl.
CPC ............. *B60L 3/0007* (2013.01); *B60K 6/40* (2013.01); *B60K 28/10* (2013.01); *B60W 20/00* (2013.01); *H02P 27/06* (2013.01); *H02P 29/024* (2013.01); *B60K 6/46* (2013.01); *B60L 2220/42* (2013.01); *B60L 2240/42* (2013.01); *B60Y 2200/92* (2013.01); *B60Y 2300/60* (2013.01); *Y10S 903/93* (2013.01)

(58) Field of Classification Search
CPC ........ B60L 3/0007; B60L 3/0015; B60L 3/00; B60L 2220/42; B60L 2240/42; B60K 6/40; B60K 28/10; B60K 6/46; B60W 20/00; H02P 27/06; H02P 29/024; B60Y 2200/92; B60Y 2300/60; Y10S 903/93
USPC ...................................................... 318/478
See application file for complete search history.

(56) References Cited

U.S. PATENT DOCUMENTS

| | | | | |
|---|---|---|---|---|
| 7,352,143 B2* | 4/2008 | Inaba | ............... | H03K 19/00376 318/139 |
| 8,620,504 B2* | 12/2013 | Komata | ................. | B60K 6/365 180/65.31 |
| 8,723,356 B2* | 5/2014 | Fukuyama | ............ | B60L 3/0007 307/9.1 |

(Continued)

FOREIGN PATENT DOCUMENTS

JP 2013-055822 A 3/2013

*Primary Examiner* — David S Luo
(74) *Attorney, Agent, or Firm* — Dinsmore & Shohl LLP

(57) ABSTRACT

A hybrid vehicle includes an electronic control unit that executes first discharge control in a state where an engine is stopped in the case where a collision detector detects a collision of the hybrid vehicle. The first discharge control includes bringing all switching elements on either one of an upper arm side and a lower arm side of either one of a first inverter and a second inverter into ON states; bringing another inverter into a gate blocking state; and discharging electric charges of a capacitor by using a discharge device until a voltage of the capacitor becomes lower than a threshold.

7 Claims, 6 Drawing Sheets

(56) References Cited

U.S. PATENT DOCUMENTS

| | | | | |
|---|---|---|---|---|
| 8,825,252 B2* | 9/2014 | Sakata | ............ | B60L 3/0015 |
| | | | | 180/65.21 |
| 9,114,698 B2* | 8/2015 | Amano | ............ | B60L 3/0007 |
| 9,219,425 B2* | 12/2015 | Sano | ............ | H02M 7/003 |
| 9,333,966 B2* | 5/2016 | Matsudaira | ............ | B60W 20/00 |
| 9,393,957 B2* | 7/2016 | Hoshiba | ............ | B60K 6/24 |
| 9,680,405 B2* | 6/2017 | Yanagi | ............ | H02P 6/24 |
| 2009/0195199 A1* | 8/2009 | Ito | ............ | B60L 3/003 |
| | | | | 318/400.22 |
| 2013/0049665 A1* | 2/2013 | Oyobe | ............ | H02P 3/22 |
| | | | | 318/489 |
| 2015/0352957 A1* | 12/2015 | Kuwano | ............ | B60L 3/0046 |
| | | | | 320/128 |

* cited by examiner

HYBRID VEHICLE AND CONTROL METHOD OF HYBRID VEHICLE

CROSS-REFERENCE TO RELATED APPLICATIONS

This application claims priority to Japanese Patent Application No. 2016-045483 filed on Mar. 9, 2016, which is incorporated herein by reference in its entirety.

BACKGROUND

1. Technical Field

The present disclosure relates to a hybrid vehicle and a control method of a hybrid vehicle that execute discharge control during a collision, the hybrid vehicle capable of traveling by using at least one of power of an engine and power of a rotary electric machine.

2. Description of Related Art

During a collision of a hybrid vehicle that travels using an engine and a motor, discharge control is desirably executed to promptly complete discharge of electric charges of a capacitor. In the discharge control, a battery is electrically disconnected, and the electric charges of the capacitor that is provided in a power control unit such as an inverter are discharged by the motor and the like.

Meanwhile, in the case where a part on a power transmission route, such as a driveshaft between a drive wheel and the motor, is dropped or the drive wheel is lifted due to the collision, the motor possibly keeps rotating inertially even when the vehicle is stopped. At this time, a counter-electromotive force that corresponds to a rotational speed is generated in the motor that has a permanent magnet in a rotor. For this reason, while the motor keeps rotating, the motor cannot be used for electrical discharge of the capacitor. Thus, there is a case where the discharge of the electric charges of the capacitor cannot promptly be completed.

For example, Japanese Patent Application Publication No. 2013-055822 (JP 2013-055822 A) discloses a technique of generating braking torque that reduces the rotational speed of the motor by turning on three phases of either one of a transistor of an upper arm and a transistor of a lower arm of the inverter during the collision of the vehicle. Furthermore, JP 2013-055822 A discloses discharge control in which the motor is electrified to consume the electric charges of a smoothing capacitor without outputting torque after the rotational speed of the motor is reduced to be lower than a specified value.

SUMMARY

In JP 2013-055822 A described above, the rotational speed of the motor is computed from a detection result of a rotational position detection sensor, and it is determined whether the motor is in a stopped state on the basis of the computed rotational speed of the motor. In addition, the determination on whether the motor is in the stopped state where the rotational speed thereof becomes lower than the specified value can be made by using a current sensor that detects a current flowing through the motor, for example. However, in the case where the rotational speed of the motor cannot be obtained due to failure of these sensors that is caused by a shock or the like during the collision of the vehicle, it cannot be determined whether the motor is in the stopped state. Accordingly, the electrical discharge of the capacitor by using the motor cannot be started. Thus, there is a case where the discharge of the electric charges stored in the capacitor cannot promptly be completed.

The present disclosure provides a hybrid vehicle and a control method of a hybrid vehicle that promptly complete discharge of electric charges of a capacitor connected to an inverter even when a rotational speed of a motor cannot be obtained due to abnormality of a sensor during a collision of a hybrid vehicle.

A hybrid vehicle according to a first aspect of the present disclosure includes: an engine; a first rotary electric machine that has a permanent magnet in a rotor; an output shaft connected to a drive wheel; a planetary gear unit that mechanically couples the engine, the rotor of the first rotary electric machine, and the output shaft; a second rotary electric machine that is connected to the output shaft and has a permanent magnet in a rotor; a first inverter that is electrically connected to the first rotary electric machine; a second inverter that is electrically connected to the second rotary electric machine; a capacitor that is connected between a pair of direct current power lines of the first inverter and the second inverter; a discharge device that is configured to discharge electric charges of the capacitor; a collision detector that is configured to detect a collision of the hybrid vehicle; and an electronic control unit that is configured to execute first discharge control in a state where the engine is stopped in a case where the collision detector detects the collision of the hybrid vehicle. Each of the first inverter and the second inverter includes: switching elements on an upper arm side of plural phases; switching elements on a lower arm side of the plural phases; and diodes that are respectively connected in reverse parallel to the switching elements. The first discharge control includes bringing all of the switching elements on either one of the upper arm side and the lower arm side of either one of the first inverter and the second inverter into ON states; bringing the other inverter into a gate blocking state; and discharging the electric charges of the capacitor by using the discharge device until a voltage of the capacitor becomes lower than a threshold.

According to the above first aspect, because a current circulation route is formed between the one inverter and the rotary electric machine that is connected to the one inverter, torque can be generated in a direction to inhibit rotation in the rotary electric machine that is connected to the one inverter. Thus, a rotational speed of the rotary electric machine that is connected to the one inverter can be reduced. Because the engine is in the stopped state and the rotary electric machine that is connected to the other inverter is coupled to the rotary electric machine that is connected to the one inverter by the planetary gear unit, a rotational speed of the other rotary electric machine can also be reduced. In the rotary electric machine that is connected to the other inverter, the rotor has the permanent magnet. Accordingly, when a rotational state is maintained in the gate blocking state, a counter-electromotive force is generated by a change in a magnetic field caused by rotation of the permanent magnet. Thus, regenerative power is supplied from the rotary electric machine to the capacitor through the diode that is connected in reverse parallel to the switching element. When the rotary electric machine that is connected to the other inverter stops rotating, a supply of the regenerative power is stopped. Thus, in the case where the electric charges of the capacitor are discharged by using the discharge device, the rotary electric machine that is connected to the other inverter stops rotating before the voltage of the capacitor becomes lower than the threshold. In this way, electric discharge by the discharge device continues until the voltage of the capacitor becomes lower than the threshold. Accordingly, without obtaining the rotational speed of the rotary electric machine, the electric discharge of the capacitor can be completed while the rotary electric machine is stopped. Therefore, even in the case where the rotational speed of the rotary electric machine cannot be obtained due to malfunction of sensors, the electric discharge can promptly be completed.

In the above first aspect, the hybrid vehicle may further include: a first detector configured to detect at least one of a rotational angle of the first rotary electric machine and a current flowing through the first rotary electric machine; and a second detector configured to detect at least one of a rotational angle of the second rotary electric machine and a current flowing through the second rotary electric machine. The electronic control unit may be configured to execute the first discharge control in the case where the collision of the hybrid vehicle is detected and when none of the rotational speed of the first rotary electric machine and the rotational speed of the second rotary electric machine can be detected by using the first detector and the second detector. The electronic control unit may be configured to execute second discharge control when at least one of the rotational speed of the first rotary electric machine and the rotational speed of the second rotary electric machine can be detected by using the first detector and the second detector even in the case where the collision of the hybrid vehicle is detected. In addition, the second discharge control may include: bringing all of the switching elements on either one of the upper arm side and the lower arm side in each of the first inverter and the second inverter into the ON states; and discharging the electric charges of the capacitor by using at least one of the first rotary electric machine, the second rotary electric machine, and the discharge device when both of the first rotary electric machine and the second rotary electric machine are in rotation stop states.

According to the above first aspect, even in the case where the collision of the hybrid vehicle is detected, it is possible to recognize that both of the first rotary electric machine and the second rotary electric machine are in the rotation stop states when at least one of the rotational speed of the first rotary electric machine and the rotational speed of the second rotary electric machine can be detected by using the first detector and the second detector. Accordingly, the electric charges of the capacitor can promptly be discharged by executing the second discharge control.

Furthermore, in the above first aspect, the hybrid vehicle may further include: a converter that is connected to the pair of direct current power lines of the first inverter and the second inverter; and a power storage device that transmits/receives electric power to/from the converter. The electronic control unit may execute the first discharge control by using the converter as the discharge device in the state where the engine is stopped in the case where the collision of the hybrid vehicle is detected.

According to the above aspect, the existing converter can be used to discharge the electric charges of the capacitor. Thus, there is no need to provide a new part (a discharge resistor or the like) whose function is specialized in the discharge of the electric charges of the capacitor. In this way, an increase in the number of parts and an increase in cost can be suppressed.

A control method of a hybrid vehicle according to a second aspect of the present disclosure is a control method of a hybrid vehicle that includes: an engine; a first rotary electric machine that has a permanent magnet in a rotor; an output shaft connected to a drive wheel; a planetary gear unit that mechanically couples the engine, the rotor of the first rotary electric machine, and the output shaft; a second rotary electric machine that is connected to the output shaft and has a permanent magnet in a rotor; a first inverter that is electrically connected to the first rotary electric machine the first inverter including switching elements on an upper arm side of plural phases, switching elements on a lower arm side of the plural phases, and diodes that are respectively connected in reverse parallel to the switching elements; a second inverter electrically connected to the second rotary electric machine, the second inverter including switching elements on an upper arm side of plural phases, switching elements on a lower arm side of the plural phases, and diodes that are respectively connected in reverse parallel to the switching elements; a capacitor that is connected between a pair of direct current power lines of the first inverter and the second inverter; a discharge device that is configured to discharge electric charges of the capacitor; and a collision detector that detects a collision of the hybrid vehicle. The control method includes: detecting presence or absence of the collision of the hybrid vehicle by the collision detector; and stopping the engine and executing first discharge control in a case where the collision is detected. The first discharge control includes: turning ON all of the switching elements on either one of the upper arm side and the lower arm side in either one of the first inverter and the second inverter; subjecting the other inverter to gate blocking; and discharging the electric charges of the capacitor by using the discharge device until a voltage of the capacitor becomes lower than a threshold.

According to the present disclosure, the hybrid vehicle can be provided. In the hybrid vehicle, the discharge of the electric charges of the capacitor that is connected to the inverter can promptly be completed even in the case where a rotational speed of a motor cannot be obtained during the collision of the hybrid vehicle due to abnormality of the sensor.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
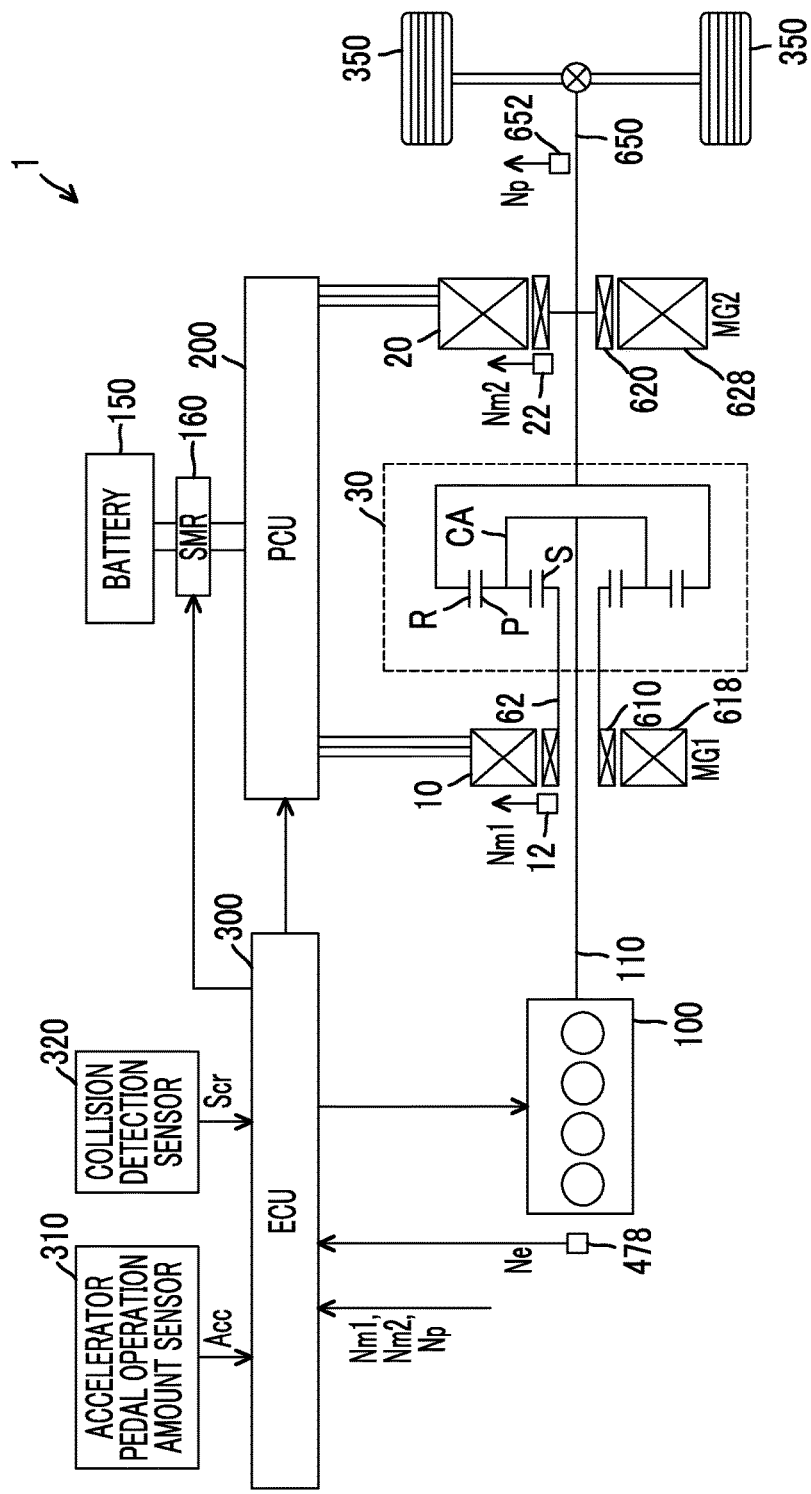
FIG. 1 is a block diagram that schematically shows an overall configuration of a vehicle.

A detailed description will hereinafter be made on an embodiment of the disclosure with reference to the drawings. Note that the same or corresponding portions in the drawings are denoted by the same reference numerals and the description thereon will not be repeated.

<Basic Configuration of Hybrid Vehicle> FIG. 1 is a block diagram that schematically shows an overall configuration of a vehicle according to the embodiment of the disclosure. With reference to FIG. 1, a vehicle 1 includes an engine 100, motor generators 10, 20, a planetary gear unit 30, a drive wheel 350, an output shaft 650 that is mechanically coupled to the drive wheel 350, a battery 150, a system main relay (SMR) 160, a power control unit (PCU) 200, and an electronic control unit (ECU) 300.

The vehicle 1 travels using at least one of power of the engine 100 and power of the motor generator 20. The vehicle 1 can switch a travel mode of the vehicle 1 between an electric vehicle travel (an EV travel), in which the power of the engine 100 is not used but the power of the motor generator 20 is used, and a hybrid vehicle travel (an HV travel) in which both of the power of the engine 100 and the power of the motor generator 20 are used.

The engine 100 is an internal combustion engine such as a gasoline engine or a diesel engine. The engine 100 generates the power by which the vehicle 1 travels in accordance with a control signal from the ECU 300. The power generated by the engine 100 is output to the planetary gear unit 30.

Each of the motor generators 10, 20 is a three-phase AC permanent magnet type synchronous motor, for example. The motor generator (a first motor generator: MG1) 10 has a rotor 610 and a stator 618. The rotor 610 is mechanically coupled to a sun gear shaft 62 that rotates in conjunction with rotation of a sun gear S of the planetary gear unit 30. The motor generator (a second motor generator: MG2) 20 has a rotor 620 and a stator 628. The rotor 620 is mechanically coupled to the output shaft 650. Note that the rotor 620 of the motor generator 20 is directly coupled to the output shaft 650 in an example of FIG. 1. However, the rotor may mechanically be coupled to the output shaft 650 through a transmission (a reducer).

The planetary gear unit 30 is configured to mechanically couple the engine 100, the motor generator 10, and the output shaft 650 and be able to transmit torque among the engine 100, the motor generator 10, and the output shaft 650. More specifically, the planetary gear unit 30 includes the sun gear S, a ring gear R, a carrier CA, and a pinion gear P as rotation elements. The sun gear S is coupled to the rotor 610 of the motor generator 10 via the sun gear shaft 62. The ring gear R is coupled to the output shaft 650. The pinion gear P meshes with the sun gear S and the ring gear R. The carrier CA is coupled to a crankshaft 110 of the engine 100 and holds the pinion gear P so as to allow rotation and revolution of the pinion gear P. Just as described, the motor generators 10, 20 are mechanically coupled to a wheel (the drive wheel 350) via the planetary gear unit 30. Note that the motor generator 10 functions as one example of the "first rotary electric machine". In addition, the motor generator 20 functions as one example of the "second rotary electric machine".

The battery 150 is shown as a representative example of a power storage device that is configured to be rechargeable. The battery 150 is constructed of a secondary battery, such as a nickel hydrogen secondary battery or a lithium-ion secondary battery representatively. As the power storage device, a capacitor such as an electric double-layered capacitor can be used. A voltage of the battery 150 is approximately 200 V, for example.

An SMR 160 is connected to the battery 150 and a PCU 200. The SMR 160 switches between a conductive state (ON) and a blocked state (OFF) between the battery 150 and the PCU 200 in accordance with a control signal from the ECU 300.

The PCU 200 boosts direct current (DC) power that is stored in the battery 150, converts the boosted voltage to an alternate current (AC) voltage, and supplies the AC voltage to the motor generator 10 and the motor generator 20. The PCU 200 also converts AC power that is generated by the motor generator 10 and the motor generator 20 to DC power, and supplies the DC power to the battery 150. A configuration of the PCU 200 will be described in detail by using FIG. 2.

Just as described, output (torque, rotational speeds) of the motor generators 10, 20 is controlled through DC/AC power conversion by the PCU 200. When the engine 100 is started, the motor generator 10 is controlled to cause rotation of the crankshaft 110 of the engine 100 by using electric power of the battery 150. The motor generator 10 can also be controlled to generate the electric power by using the power of the engine 100. The AC power that is generated by the motor generator 10 is converted to the DC power by the PCU 200 and is stored in the battery 150. There is also a case where the AC power that is generated by the motor generator 10 is supplied to the motor generator 20.

The motor generator 20 uses at least one of the supplied electric power from the battery 150 and the generated electric power by the motor generator 10 to cause rotation of the output shaft 650. The motor generator 20 can also generate the electric power by regenerative braking. The AC power that is generated by the motor generator 20 is converted to the DC power by the PCU 200. The converted DC power is used for charging of the battery 150.

Figure 2:
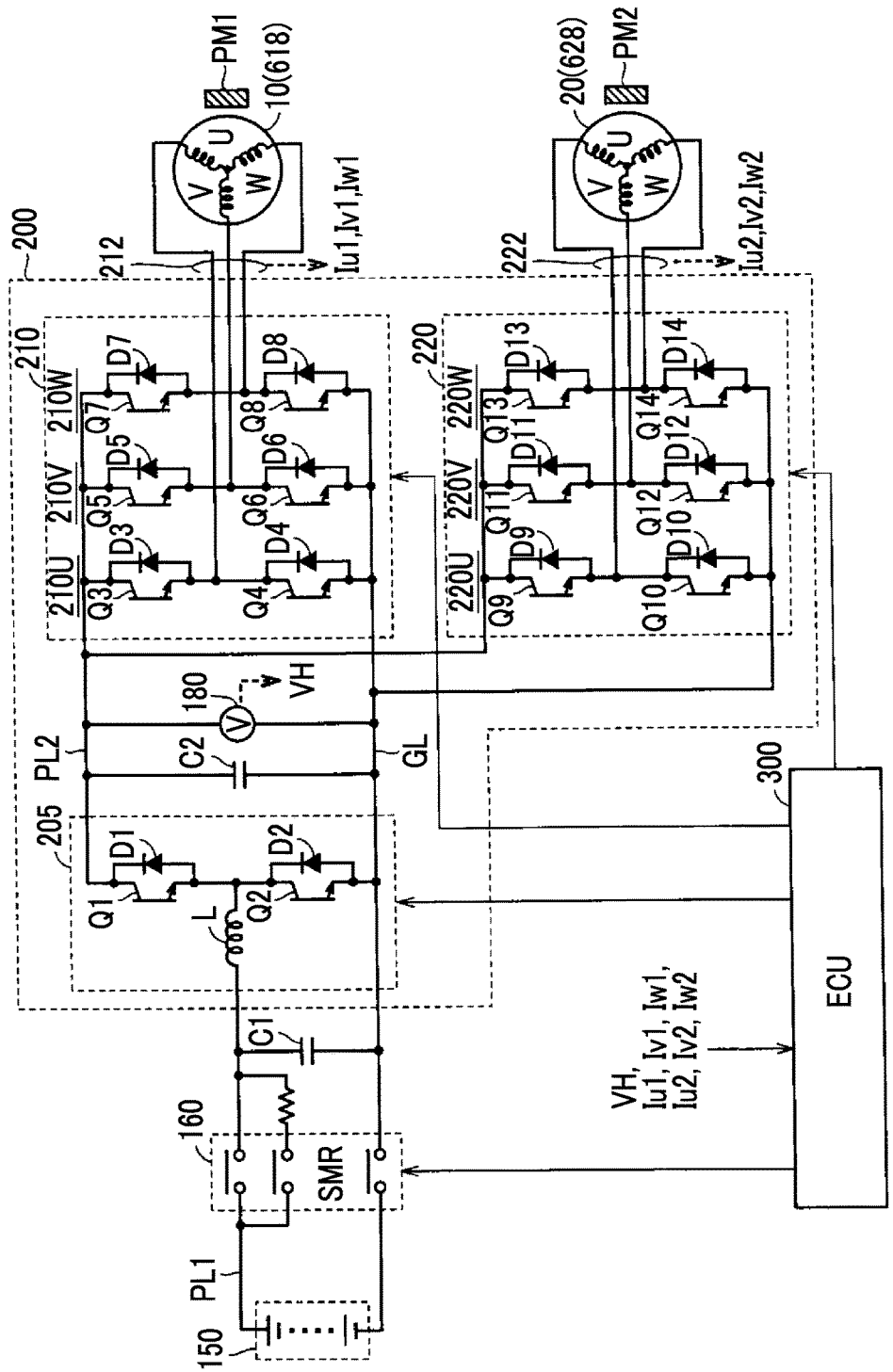
FIG. 2: is a circuit block diagram that illustrates a configuration example of an electrical system of the vehicle.

In this embodiment, the motor generators 10, 20 are so-called permanent magnet motors in which the rotors 610, 620 are provided with permanent magnets (see PM1, PM2 in FIG. 2). The permanent magnet may be provided in such a structure that the permanent magnet is embedded in the rotor, or may be provided in such a structure that the permanent magnet is attached to a surface of the rotor.

Although not shown, the ECU 300 is configured by including a central processing unit (CPU), a memory, an input/output buffer, and the like. Based on signals from each sensor and equipment as well as on a map and a program stored in the memory, the ECU 300 controls various types of equipment to realize a desired travel state of the vehicle 1. Note that various types of control can be processed not only by software but also by dedicated hardware (an electronic circuit). Here, it is described in this embodiment that the one integrated ECU 300 controls various types of the equipment included in the vehicle 1. However, various types of the equipment included in the vehicle 1 may be controlled by combining plural ECUs.

More specifically, a voltage sensor 180 (FIG. 2), a crank angle sensor 478, resolvers 12, 22, a first current detector 212 (FIG. 2), a second current detector 222 (FIG. 2), a vehicle speed sensor 652, an accelerator pedal operation amount sensor 310, a collision detection sensor 320, and the like are connected to the ECU 300 either directly or indirectly via a communication line.

The crank angle sensor 478 detects a speed (an engine speed) Ne of the crankshaft 110. The resolver 12 detects a rotational speed (an MG1 rotational speed) Nm1 of the motor generator 10. The resolver 22 detects a rotational speed (an MG2 rotational speed) Nm2 of the motor generator 20. Each of the sensors outputs a signal indicative of a detection result thereof to the ECU 300.

In FIG. 2, the voltage sensor 180 detects a voltage (a system voltage) VH at each end of a capacitor C2. The voltage sensor 180 outputs a signal indicative of a detection result thereof to the ECU 300.

In FIG. 2, the first current detector 212 detects phase currents (Iu1, Iv1, Iw1) of the motor generator 10. The first current detector 212 includes plural sensors that respectively detect the currents of the phases. The second current detector 222 detects phase currents (Iu2, Iv2, Iw2) of the motor generator 20. The second current detector 222 includes plural sensors that respectively detect the currents of the phases. The first current detector 212 and the second current detector 222 each output a signal indicative of a detection result thereof to the ECU 300.

The vehicle speed sensor 652 detects a rotational speed Np of the output shaft 650 and outputs a signal indicative of a detection result thereof to the ECU 300. The ECU 300 computes a vehicle speed V on the basis of a signal from the vehicle speed sensor 652.

The accelerator pedal operation amount sensor 310 detects an operation amount of an accelerator pedal (not shown) (an accelerator pedal operation amount) Acc and outputs a signal indicative of a detection result thereof to the ECU 300. Based on the accelerator pedal operation amount Acc and the vehicle speed V, the ECU 300 sets requested output to the engine 100. The ECU 300 controls an intake air amount, ignition timing, fuel injection timing, a fuel injection amount, and the like of the engine 100 such that the engine 100 operates at an operation point (a combination of the engine speed and engine torque) at which the engine 100 generates the set requested output in accordance with a travel condition of the vehicle 1.

The collision detection sensor 320 is constructed of a G sensor (an acceleration sensor), for example, and outputs a collision detection signal Scr to the ECU 300 when detecting that acceleration exceeding a specified threshold acts on the vehicle 1.

When receiving the collision detection signal Scr from the collision detection sensor 320, the ECU 300 electrically disconnects the battery 150 from the PCU 200 by turning off the SMR 160, and executes a discharge process of electric charges stored in the PCU 200. When receiving the collision detection signal Scr from the collision detection sensor 320, the ECU 300 also stops the engine 100.

<About Configuration of Electrical System of Hybrid Vehicle> FIG. 2 is a circuit block diagram that illustrates a configuration example of an electrical system of the vehicle 1. With reference to FIG. 1 and FIG. 2, the electrical system of the vehicle 1 includes the battery 150, the SMR 160, a capacitor C1, and the PCU 200. The PCU 200 includes a converter 205, the capacitor C2, a first inverter 210, and a second inverter 220.

The capacitor C1 is connected between a positive electrode line PL1 and a negative electrode line GL. The positive electrode line PL1 is electrically connected to a positive electrode of the battery 150. The negative electrode line GL is electrically connected to a negative electrode of the battery 150. The capacitor C1 smoothes an AC component of a voltage fluctuation between the positive electrode line PL1 and the negative electrode line GL.

During a boosting operation, the converter 205 boosts a voltage VB (a voltage at each end of the capacitor C1) supplied from the battery 150 via the capacitor C1, and supplies the boosted voltage VB to the first inverter 210 and the second inverter 220. On the other hand, during a step-down operation, the converter 205 reduces the voltages that are supplied from the first inverter 210 and the second inverter 220 via the capacitor C2 to charge the battery 150.

The converter 205 is constructed of a so-called chopper circuit and has transistors Q1, Q2, diodes D1, D2, and a reactor L. The transistors Q1, Q2 are connected in series between a positive electrode line PL2 and the negative electrode line GL. The diodes D1, D2 are respectively connected in reverse parallel to the transistors Q1, Q2. ON/OFF of each of the transistors Q1, Q2 are controlled by a switching control signal from the ECU 300. The reactor L is electrically connected to the battery 150 in series between an emitter and a collector of the transistor Q2.

The capacitor C2 is connected between the positive electrode line PL2 and the negative electrode line GL. The capacitor C2 smoothes an AC component of the DC voltage between the positive electrode line PL2 and the negative electrode line GL. During the travel of the vehicle, a voltage of the capacitor C2 is controlled to fall within a range of approximately 200 to 600 V by the converter 205, for example.

During the travel of the vehicle, the first inverter 210 and the second inverter 220 respectively control a current or a voltage of each phase coil of the motor generators 10, 20 such that the motor generators 10, 20 operate in accordance with an operation command value (representatively a torque command value) that is set to generate drive power (vehicle drive torque, electric power generation torque, or the like) requested for the travel of the vehicle.

The first inverter 210 is constructed of a general three-phase inverter and includes a U-phase arm 210U, a V-phase arm 210V, and a W-phase arm 210W. The U-phase arm 210U has transistors Q3, Q4 and antiparallel diodes D3, D4. The V-phase arm 210V has transistors Q5, Q6 and antiparallel diodes D5, D6. The W-phase arm 210W has transistors Q7, Q8 and antiparallel diodes D7, D8.

The transistors Q3, Q5, Q7 of the first inverter 210 each function as a "switching element on an upper arm side" of the first inverter 210. The transistors Q4, Q6, Q8 of the first inverter 210 each function as a "switching element on a lower arm side" of the first inverter 210.

Note that the second inverter 220 has transistors Q9 to Q14 and diodes D9 to D14 in a similar manner to the first inverter 210 and these components constitute a U-phase arm 220U, a V-phase arm 220V, and a W-phase arm 220W.

The transistors Q9, Q11, Q13 of the second inverter 220 each function as a "switching element on an upper arm side" of the second inverter 220. The transistors Q10, Q12, Q14 of the second inverter 220 each function as a "switching element on a lower arm side" of the second inverter 220.

Intermediate points of phase arms 210U, 210V, 210W of the first inverter 210 are respectively connected to ends of U-phase, V-phase, W-phase coil wires that are wound around the stator 618 of the motor generator 10: The same can be said for intermediate points of phase arms 220U, 220V, 220W of the second inverter 220. In each of the stators 618, 628, the other ends of phase coil wires are connected in common at a neutral point.

Based on the accelerator pedal operation amount Acc and the vehicle speed V as well as on the MG1 rotational speed Nm1 and the MG2 rotational speed Nm2, the ECU 300 computes an output voltage command of the converter 205, the torque command value of the motor generator 10, and the torque command value of the motor generator 20. Furthermore, the ECU 300 monitors states (the rotational speeds, energizing currents, temperatures, and the like) of the motor generators 10, 20 on the basis of the detection results of the resolvers 12, 22 (FIG. 1), the first current detector 212, the second current detector 222, and the voltage sensor 180. In addition, the ECU 300 controls the converter 205, the first inverter 210, and the second inverter 220 in accordance with the above voltage command value and the above torque command value and thereby controls the output of the motor generators 10, 20.

<About Discharge Control During Collision of Vehicle>
In the vehicle 1 having the configuration as described above, when the ECU 300 receives the collision detection signal Scr from the collision detection sensor 320 due to a collision of the vehicle 1 as described above, the ECU 300 desirably stops the engine 100, turns off the SMR 160, and executes the discharge process to discharge the electric charges stored in the capacitors C1, C2 in the PCU 200, so as to promptly complete discharge of the electric charges stored in the capacitors C1, C2.

Meanwhile, in the case where a part on a power transmission route, such as the driveshaft between the drive wheel 350 and the motor generator 20, is dropped or the drive wheel 350 is lifted due to the collision, the motor generators 10, 20 possibly keep rotating inertially even when the vehicle 1 is stopped. At this time, in each of the motor generator 10 that has the permanent magnet in the rotor 610 and the motor generator 20 that has the permanent magnet in the rotor 620, a counter-electromotive force is generated in accordance with the rotational speed thereof. For this reason, while the motor generators 10, 20 keep rotating, the motor generators 10, 20 cannot be used for the discharge of the capacitors C1, C2. Thus, there is a case where the electric charges of the capacitors C1, C2 cannot promptly be discharged.

In such a case, for example, in the case where the motor generators 10, 20 rotate during the collision of the vehicle 1, it is considered to execute three-phase ON control in which either all of the switching elements of the upper arm or all of the switching elements of the lower arm in each of the first inverter 210 and the second inverter 220 are brought into ON states and the others are brought into OFF states. When the three-phase ON control is executed in the first inverter 210, a current circulation route is established between the motor generator 10 and the first inverter 210. Then, when the current flows between the motor generator 10 and the first inverter 210 by a counter-electromotive voltage of the motor generator 10, counter-electromotive torque in a direction to inhibit the rotation is generated in the motor generator 10. Similarly, when the three-phase ON control is executed in the second inverter 220, the counter-electromotive torque in the direction to inhibit the rotation is also generated in the motor generator 20. Accordingly, after the rotation of each of the motor generators 10, 20 is stopped by the counter-electromotive torque, discharge control of the capacitors C1, C2 can be executed by using the motor generators 10, 20.

Meanwhile, in the case where the rotational speeds of the motor generators 10, 20 are reduced by the three-phase ON control during the collision of the vehicle 1, the rotational speed Nm1 of the motor generator 10 or the rotational speed Nm2 of the motor generator 20 has to be obtained in order to make a determination on whether the rotation of the motor generator 10 or the motor generator 20 is stopped. As described above, the ECU 300 computes the rotational speeds Nm1, Nm2 of the motor generators 10, 20 on the basis of the detection results of the resolvers 12, 22. In addition, the ECU 300 can determine whether the rotation of the motor generator 20 is stopped on the basis of the detection results of the first current detector 212 and the second current detector 222.

However, in the cases where any of these sensors malfunctions due to a shock or the like during the collision of the vehicle 1 and the rotational speeds Nm1, Nm2 of the motor generators 10, 20 cannot be obtained, it cannot be determined whether the motor generators 10, 20 are in stopped states.

Figure 3:
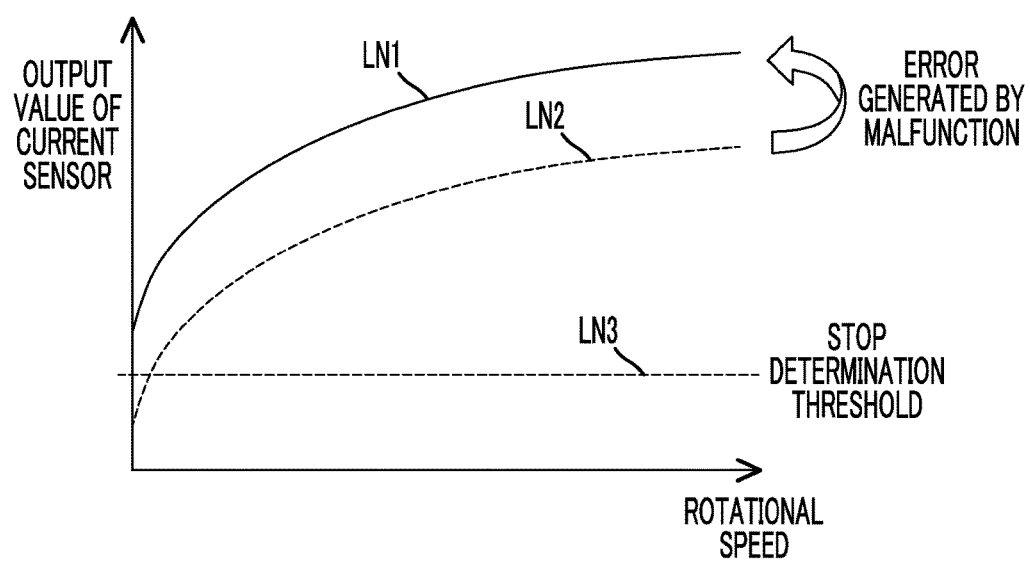
FIG. 3 is a graph that illustrates a relationship between a rotational speed of a motor generator and an output value of a first current detector during a normal time and an abnormal time.

For example, FIG. 3 shows one example of a relationship between the rotational speed of the motor generator 10 and an output value (for example, the U-phase current Iu1) of the first current detector 212. A horizontal axis in FIG. 3 represents the rotational speed of the motor generator 10, and a vertical axis in FIG. 3 represents an output value of the first current detector 212.

A solid line LN1 in FIG. 3 represents the relationship between the rotational speed Nm1 of the motor generator 10 and the output value of the first current detector 212 in the case where the first current detector 212 is in an abnormal state. A broken line LN2 in FIG. 3 represents the relationship between the rotational speed Nm1 of the motor generator 10 and the output value of the first current detector 212 in the case where the first current detector 212 is in a normal state.

As indicated by the broken line LN2 in FIG. 3, in the case where the first current detector 212 is in the normal state, it is determined whether the output value of the first current detector 212 is equal to or smaller than a stop determination threshold that is represented by a broken line LN3 in FIG. 3. In this way, it can be determined whether the rotation of the motor generator 10 is in a stopped state. On the other hand, in the case where the first current detector 212 is in the abnormal state, the output value of the first current detector 212 is offset in a positive direction with respect to the output value of the first current detector 212 at a time when the first current detector 212 is in the normal state. In this case, the output value of the first current detector 212 always becomes larger than the stop determination threshold in a rotational speed range in a positive rotational direction. In this case, it cannot be determined whether the motor generator 10 is in the stopped state by using the detection result of the first current detector 212.

It has been described above that it cannot be determined whether the motor generator 10 is in the stopped state in the case where the first current detector 212 is in the abnormal state. For example, the same applies to a case where the resolver 12 is used to determine whether the motor generator 10 is in the stopped state, a case where the second current detector 222 is used to determine whether the motor generator 20 is in the stopped state, and a case where the resolver 22 is used to determine whether the motor generator 20 is in the stopped state. Thus, a detailed description on each of those cases will not be made.

<About Discharge Control in This Embodiment> As described above, in the case where it cannot be determined whether the rotation of each of the motor generators 10, 20 is in the stopped states, electric discharge of the capacitors C1, C2 cannot be started by using the motor generators 10, 20. Thus, there is a case where the discharge of the electric charges stored in the capacitors C1, C2 cannot promptly be completed.

Accordingly, in this embodiment, when the collision detection sensor 320 detects the collision of the vehicle 1, the ECU 300 executes first discharge control in a state where the engine 100 is stopped.

This first discharge control includes: control of bringing all of the switching elements on the upper arm side or the lower arm side in one inverter of the first inverter 210 and the second inverter 220 into the ON states; control of bringing the other inverter into a gate blocking state; and control of discharging the electric charges of the capacitors C1, C2 by using the converter 205 until the voltage VH becomes lower than a threshold.

In this way, even when the rotational speeds Nm1, Nm2 of the motor generators 10, 20 cannot be obtained due to the malfunction of the resolvers 12, 22 or the malfunction of the first current detector 212 and the second current detector 222, the rotation of each of the motor generators 10, 20 is stopped, and the electric discharge of the capacitors C1, C2 can be completed.

Figure 4:
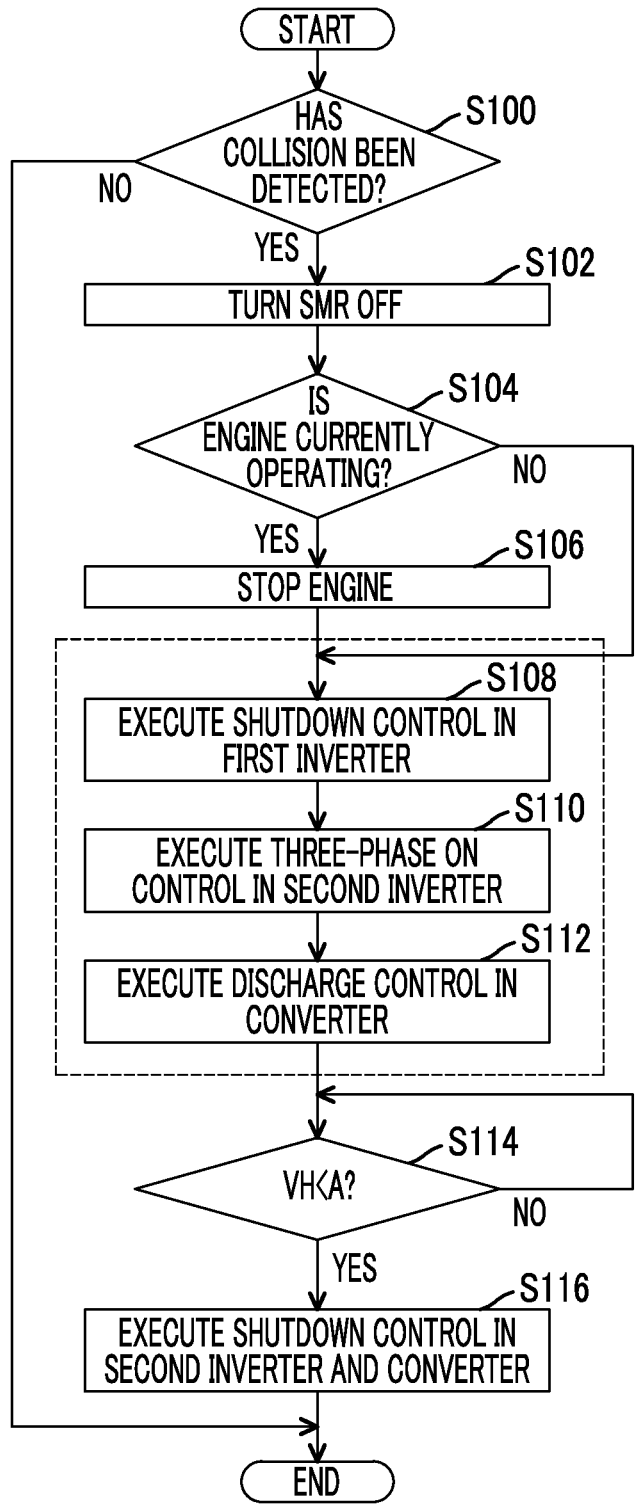
FIG. 4 is a flowchart of a control process that is executed by an ECU mounted on the vehicle according to an embodiment.

FIG. 4 is a flowchart of a control process that includes the first discharge control executed by the ECU 300 in this embodiment.

In step (hereinafter a step will be abbreviated as "S") 100, the ECU 300 determines whether the collision of the vehicle 1 has been detected. The ECU 300 determines that the collision of the vehicle 1 has been detected, for example, when receiving the collision detection signal Scr from the collision detection sensor 320. If it is determined that the collision of the vehicle 1 has been detected (YES in S100), the process proceeds to S102.

In S102, the ECU 300 brings the SMR 160 into an OFF state. In S104, the ECU 300 determines whether the engine 100 is currently operating. The ECU 300 determines that the engine 100 is currently operating, for example, in the case where the engine speed Ne is higher than the threshold or in the case where ignition control or fuel injection control is executed. If it is determined that the engine 100 is currently operating (YES in S104), the process proceeds to S106.

In S106, the ECU 300 stops the engine 100. The ECU 300 stops the engine 100, for example, by stopping the ignition control or the fuel injection control.

In S108, the ECU 300 executes shutdown control in the first inverter 210. More specifically, the ECU 300 brings all of the transistors Q3 to Q8 of the first inverter 210 into the OFF states, so as to realize the gate blocking state.

In S110, the ECU 300 executes the three-phase ON control in the second inverter 220. The ECU 300 brings the transistors Q9, Q11, Q13 on the upper arm side of the second inverter 220 into the ON states, for example. At this time, the ECU 300 brings the transistors Q10, Q12, Q14 on the lower arm side of the second inverter 220 into the OFF states.

Note that the ECU 300 may bring the transistors Q10, Q12, Q14 on the lower arm side of the second inverter 220 into the ON states and may bring the transistors Q9, Q11, Q13 on the upper arm side of the second inverter 220 into the ON states.

In S112, the ECU 300 executes the discharge control in the converter 205. In this embodiment, the ECU 300 makes the converter 205 operate as a discharge device that discharges the electric charges stored in the capacitors C1, C2. In the state where the SMR 160 is OFF, the ECU 300 turns the transistor Q1 ON and turns the transistor Q2 OFF. In this way, the current flows from the capacitor C2 to the transistor Q1 and the reactor L, and the electric charges are thereby consumed. Next, the ECU 300 turns the transistor Q1 OFF and turns the transistor Q2 ON. In this way, the current flows from the capacitor C1 to the transistor Q2 through the reactor L, and the electric charges are thereby consumed. Just as described, the transistors Q1, Q2 are driven to be ON/OFF in the state where the SMR 160 is OFF. In this way, the electric charges stored in the capacitors C1, C2 are discharged. Note that the processes of S108, S110, S112 broken-line frame in FIG. 4 may be executed in parallel or may be executed in an order other than an order indicated in the broken-line frame.

In S114, the ECU 300 determines whether the voltage VH is lower than a threshold A. Note that the threshold A is a value of the voltage VH at which safety of an occupant or a worker can be secured, for example, and is a predetermined value of approximately several volts to several tens of volts, for example. If it is determined that the voltage VH is lower than the threshold A (YES in S114), the process proceeds to S116.

In S116, the ECU 300 executes the shutdown control in each of the second inverter 220 and the converter 205. That is, the ECU 300 brings the transistors Q9 to Q14 into the OFF states and thereby brings the second inverter 220 into the gate blocking state. Furthermore, the ECU 300 brings the transistors Q1, Q2 into the OFF states and thereby brings the converter 205 into the gate blocking state.

Note that, if the collision of the vehicle 1 cannot be detected (NO in S100), the ECU 300 terminates this process. If the engine 100 is not currently operating (NO in S104) after the collision of the vehicle 1 is detected (YES in S100), the ECU 300 advances the process to S108. Furthermore, if it is determined that the voltage VH is equal to or higher than the threshold A (NO in S114), the ECU 300 returns the process to S114.

A description will be made on an operation of the ECU 300 that is mounted on the vehicle 1 according to this embodiment and that is based on the configuration and the flowchart as described so far with reference to FIG. 5 and FIG. 6. For example, a case where the engine 100 is currently operating and the vehicle 1 is currently traveling is assumed.

If receiving the collision detection signal Scr from the collision detection sensor 320 due to the collision of the vehicle 1 or the like (YES in S100), the ECU 300 brings the SMR 160 into the OFF state (S102). At this time, the engine 100 is operating (YES in S104). Thus, the engine 100 is stopped (S106).

After the collision of the vehicle 1, the part on the power transmission route, such as the driveshaft is dropped, the drive wheel 350 is in a lifted state, or the like due to the collision in a stopped state of the engine 100. For this reason, rotational states of the motor generators 10, 20 continues. Such a case is assumed.

Figure 5:
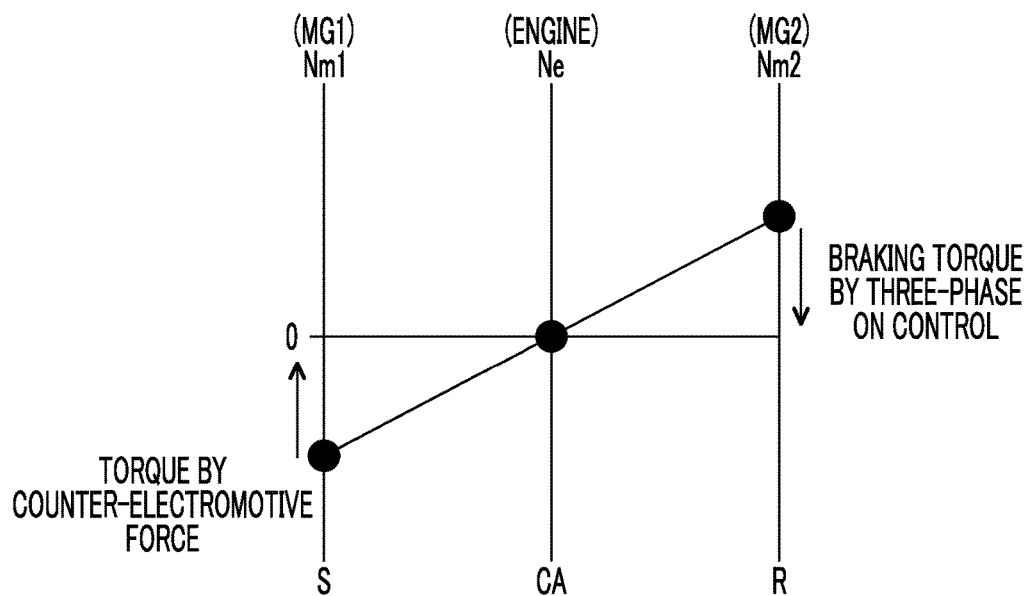
FIG. 5 is a collinear diagram that illustrates an operation of first discharge control.

At this time, a relationship between the rotational speeds Nm1, Nm2 of the motor generators 10, 20, each of which is coupled to the planetary gear unit 30, and the engine speed Ne is in a state indicated by a collinear diagram in FIG. 5. FIG. 5 is a collinear diagram that illustrates changes in the rotational states of the motor generators 10, 20 after the collision. As shown in FIG. 5, the engine speed Ne becomes zero, and the motor generators 10, 20 rotate in inertial states.

At this time, the first discharge control is executed. That is, the shutdown control is executed in the first inverter 210 (S108), and the three-phase ON control is executed in the second inverter 220 (S110). When the three-phase ON control is executed in the second inverter 220, as shown in the collinear diagram in FIG. 5, braking torque in the direction to inhibit the rotation (a lower direction of the sheet in FIG. 5) acts on the ring gear R of the planetary gear unit 30.

Meanwhile, when the transistors Q3 to Q8 of the first inverter 210 are brought into the gate blocking states, the diodes D3 to D8 of the first inverter 210 constitute a three-phase, full-wave rectifier circuit. A permanent magnet PM1 is provided in the rotor 620 of the motor generator 10. Thus, when the permanent magnet PM1, which is provided in the rotor 620 of the motor generator 10, rotates, the counter-electromotive force is generated in the motor generator 10 and is supplied to the capacitor C2 through the first inverter 210. At this time, when the current flows from the motor generator 10 toward the first inverter 210, the torque that acts in the direction to inhibit the rotation of the motor generator 10 is generated in the motor generator 10. Thus, the torque generated in the motor generator 10 acts in a positive direction (an upper direction on the sheet of FIG. 6) on the sun gear S of the planetary gear unit 30.

Accordingly, the torque by the counter-electromotive force acts on each of the motor generators 10, 20 in the direction to inhibit the rotation thereof. Thus, the rotational speeds Nm1, Nm2 of the motor generators 10, 20 are reduced as time elapses.

In addition, the shutdown control in the first inverter 210 and the three-phase ON control in the second inverter 220 are executed, and the discharge control is executed in the converter 205 (S112). That is, because ON/OFF of the transistors Q1, Q2 of the converter 205 is repeated, the electric charges stored in the capacitors C1, C2 are consumed by the reactor L.

Thus, at a time point, at which the above-described first discharge control is initiated, onward, the voltage VH is reduced as the time elapses. FIG. 6 is a chart that illustrates a change in the voltage after the collision. A horizontal axis of FIG. 6 represents time, and a vertical axis of FIG. 6 represents the voltage VH and the counter-electromotive voltage of the motor generator 10.

Figure 6:
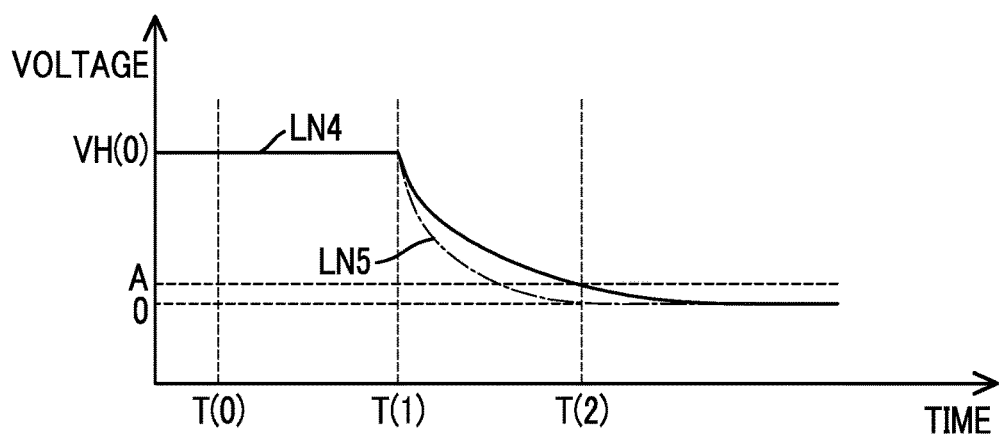
FIG. 6 is a timing chart that illustrates a change in a voltage VH after a collision.

For example, as indicated by a solid line LN4 in FIG. 6, a case where the voltage VH is maintained in a constant state at VH(0) is assumed. At time T(0), the collision of the vehicle 1 is detected. When the first discharge control is executed at time T(1), the voltage VH is reduced by the discharge control in the converter 205.

The rotational speeds Nm1, Nm2 are reduced by the torque that is generated in the direction to inhibit the rotation of the motor generators 10, 20. Thus, as indicated by a one-dot chain line LN5 in FIG. 6, the counter-electromotive voltage that is generated in accordance with the rotation of the motor generator 10 is reduced at time T(1), at which the first discharge control is initiated, onward.

When the voltage VH becomes lower than the threshold A at time T(2) (YES in S114), the rotation of each of the motor generators 10, 20 is brought into the stopped state. Thus, the electric discharge of the capacitors C1, C2 is completed. Then, the shutdown control of the first inverter 210 continues, and the shutdown control is executed in the second inverter 220 and the converter 205 (S116).

As it has been described so far, according to the vehicle 1 of this embodiment, the current circulation route is established between the second inverter 220 and the motor generator 20 by executing the three-phase ON control in the second inverter 220. Accordingly, the torque in the direction to inhibit the rotation can in the motor generator 20. Thus, the rotational speed of the motor generator 20 can be reduced. The engine 100 is in the stopped state, and the rotational speed of the motor generator 10, which is coupled to the motor generator 20 by the planetary gear unit 30, can also be reduced. In addition, because the shutdown control is executed on the first inverter 210, the counter-electromotive force is generated in the motor generator 10 due to a change in a magnetic field by rotation of the permanent magnet provided in the rotor. Accordingly, regenerative power is supplied from the motor generator 10 to the capacitor C2 through the diodes D3 to D8 that are connected in reverse parallel. When the rotation of the motor generator 20 is stopped, a supply of the regenerative power is also stopped. Accordingly, in the case where the electric charges of the capacitors C1, C2 are discharged by using the converter 205, the rotation of the motor generator 10 is stopped before the voltage VH becomes lower than the threshold A. In this way, the electric discharge by the converter 205 continues until the voltage VH becomes lower than the threshold A. Thus, the motor generators 10, 20 are stopped without obtaining the rotational speeds Nm1, Nm2 of the motor generators 10, 20, and the electric discharge of the capacitors C1, C2 can be completed. Even in the case where the rotational speeds Nm1, Nm2 of the motor generators 10, 20 cannot be obtained due to the malfunction of the sensors, the electric discharge of the capacitors C1, C2 can promptly be completed. Therefore, it is possible to provide the hybrid vehicle in which the discharge of the electric charges of the capacitor connected to the inverter are promptly completed even in the case where the rotational speed of the motor cannot be obtained due to abnormality of the sensor during the collision of the vehicle.

In addition, the existing converter 205 can be used as the discharge device that discharges the electric charges of the capacitors C1, C2. Thus, there is no need to provide a new part (a discharge resistor or the like) whose function is specialized in the discharge of the electric charges of the capacitors C1, C2. Therefore, an increase in the number of parts and an increase in cost can be suppressed.

A description will hereinafter be made on a modified example. In this embodiment, the description has been made on the case where the existing converter 205 is used as the discharge device. However, a discharge circuit that includes a resistor body and a switch as the discharge device may be provided in addition to the converter 205. More specifically, the discharge circuit may be a circuit that includes, for example: the resistor body that is connected in parallel to the capacitor C1; and a switch that switches a state of a route through the resistor body between a conductive state and a blocking state. Such a discharge circuit may be provided in the capacitor C2.

In this embodiment, the description has been made on the case where the rotor of the motor generator 10 is connected to the sun gear S of the planetary gear unit 30, the output shaft of the engine 100 is connected to the carrier CA, and the output shaft 650 is connected to the ring gear R as one example. A connection relationship among the rotor of the motor generator 10 in the planetary gear unit 30, the output shaft of the engine 100, and the output shaft 650 is not particularly limited to the above-described connection relationship. For example, the output shaft of the engine 100 may be connected to the sun gear S of the planetary gear unit 30, and the output shaft 650 may be connected to the sun gear S of the planetary gear unit 30. Alternatively, the rotor of the motor generator 10 may be connected to the carrier CA in the planetary gear unit 30, and the output shaft 650 may be connected to the carrier CA in the planetary gear unit 30. Furthermore, the rotor of the motor generator 10 may be connected to the ring gear R in the planetary gear unit 30, and the output shaft of the engine 100 may be connected to the ring gear R in the planetary gear unit 30.

In this embodiment, the description has been made on the case where the shutdown control is executed in the first inverter 210 and the three-phase ON control is executed in the second inverter 220 when the collision of the vehicle 1 is detected as one example. However, for example, when the collision of the vehicle 1 is detected, the three-phase ON control may be executed in the first inverter 210, and the shutdown control may be executed in the second inverter 220.

In this embodiment, the description has been made that the electric charges stored in the capacitors C1, C2 are discharged in accordance with the control process shown in the flowchart in FIG. 4 regardless of whether the sensors that detect the rotational states of the motor generators 10, 20, such as the resolvers 12, 22, the first current detector 212, and the second current detector 222, are in the normal states. However, an aspect of the discharge control may be changed in accordance with whether such sensors are in the normal states.

Figure 7:
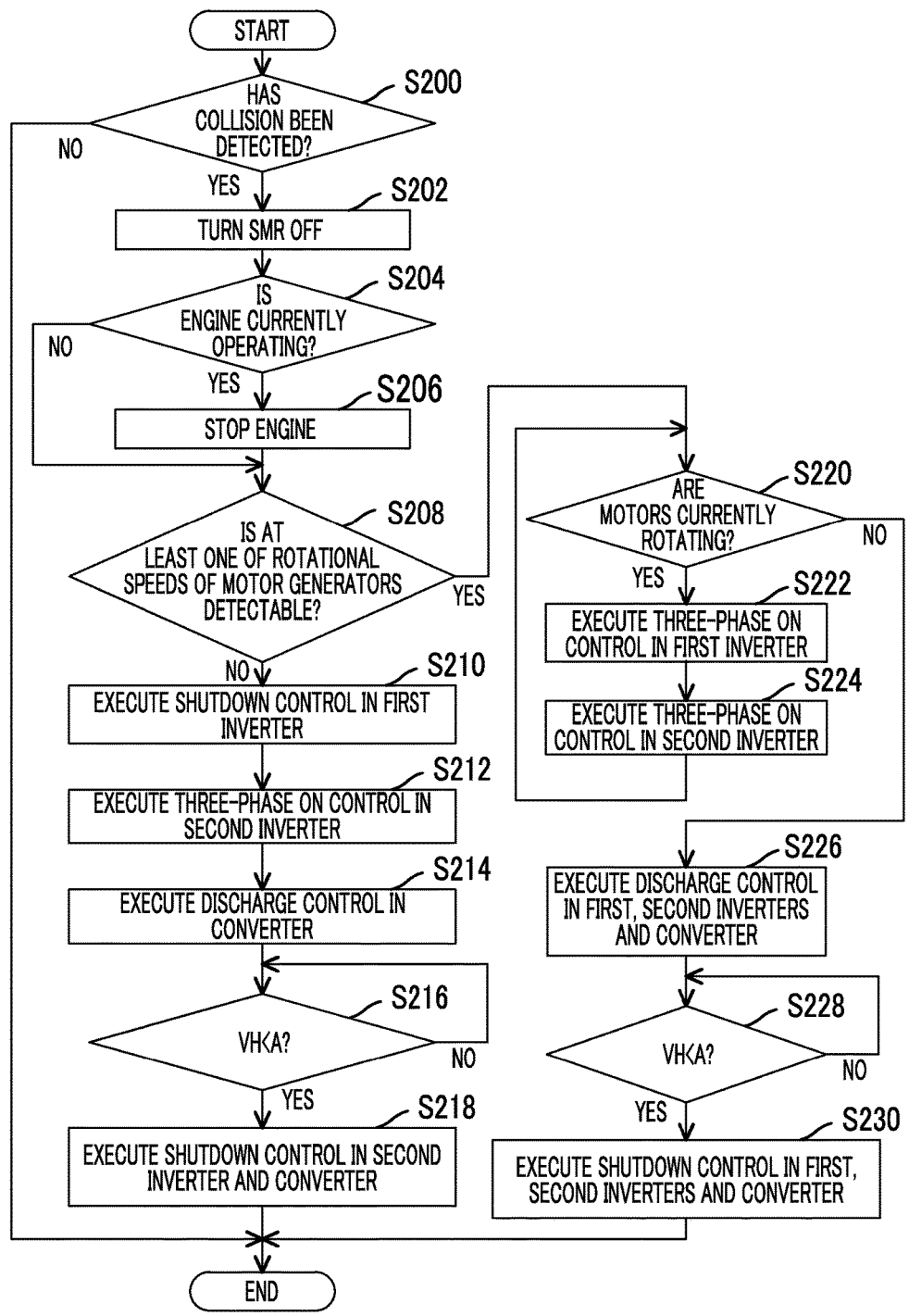
FIG. 7 is a flowchart of a control process that is executed by the ECU mounted on a vehicle according to a modified example.

FIG. 7 is a flowchart that illustrates a control process executing discharge control in an aspect that depends on whether the rotational states of the motor generators 10, 20 can be detected.

Note that the process from S200 to S206 and the process from S210 to S218 in FIG. 7 are the same as the process from S100 to S106 and the process from S108 to S116 in FIG. 4. Thus, the detailed description thereon will not be made.

In S208, the ECU 300 determines whether at least one of the rotational speeds Nm1, Nm2 of the motor generators 10, 20 can be detected. The ECU 300 determines that none of the rotational speeds Nm1, Nm2 of the motor generators 10, 20 can be detected, for example, in the case where all of the resolvers 12, 22, the first current detector 212, and the second current detector 222 malfunction. For example, the ECU 300 determines whether each of the output values of the resolvers 12, 22, the first current detector 212, and the second current detector 222 exceeds a value that is obtained during the normal time. The ECU 300 determines that all of the resolvers 12, 22, the first current detector 212, and the second current detector 222 malfunction, for example, when each of the output values exceeds the value that is obtained during the normal time.

If it is determined that none of the rotational speeds Nm1, Nm2 of the motor generators 10, 20 can be detected (NO in S208), the ECU 300 advances the process to S210 and executes the first discharge control.

On the other hand, if it is determined that any of the rotational speeds Nm1, Nm2 of the motor generators 10, 20 can be detected (YES in S208), the ECU 300 advances the process to S220 and executes second discharge control.

The second discharge control includes: the three-phase ON control that is executed in each of the first inverter 210 and the second inverter 220; and control that discharges the electric charges of the capacitors C1, C2 by using the motor generators 10, 20 and the converter 205 when both of the motor generators 10, 20 are in rotation stop states.

In S220, the ECU 300 determines whether the motor generators 10, 20 are currently rotating. The ECU 300 may determine that the motor generators 10, 20 are currently rotating, for example, in the case where both of the rotational speed Nm1 of the motor generator 10 and the rotational speed Nm2 of the motor generator 20 are higher than the thresholds. In the case where either one of the rotational speeds of the rotational speeds Nm1, Nm2 of the motor generators 10, 20 cannot be detected, the ECU 300 computes the one rotational speed by using the other rotational speed and a gear ratio in the planetary gear unit 30 with a precondition that the engine speed Ne is zero. In addition, for example, in the case where the resolver 12 and the first current detector 212 are in the normal states, the ECU 300 estimates the rotational speed Nm1 of the motor generator 10 on the basis of the detection result of the resolver 12. In the case where the resolver 12 malfunctions, the ECU 300 estimates the rotational speed Nm1 of the motor generator 10 on the basis of the detection result of the first current detector 212. The same can be said for the rotational speed Nm2 of the motor generator 20. Thus, the detailed description thereon will not be made.

If it is determined that the motor generators 10, 20 are currently rotating (YES in S220), the process proceeds to S222.

In S222, the ECU 300 executes the three-phase ON control in the first inverter 210. More specifically, the ECU 300 brings all of the transistors Q3, Q5, Q7 on the upper arm side of the first inverter 210 into the ON states and brings all of the transistors Q4, Q6, Q8 on the lower arm side thereof into the OFF states, for example. Note that the ECU 300 may bring all of the transistors Q3, Q5, Q7 on the upper arm side of the first inverter 210 into the OFF states and may bring all of the transistors Q4, Q6, Q8 on the lower arm side thereof into the ON states.

In S224, the ECU 300 executes the three-phase ON control in the second inverter 220. More specifically, the ECU 300 brings all of the transistors Q9, Q11, Q13 on the upper arm side of the second inverter 220 into the ON states and brings all of the transistors Q10, Q12, Q14 on the lower arm side thereof into the OFF states, for example. Note that the ECU 300 may bring all of the transistors Q9, Q11, Q13 on the upper arm side of the second inverter 220 into the OFF states and may bring all of the transistors Q10, Q12, Q14 on the lower arm side thereof into the ON states. Thereafter, the ECU 300 returns the process to S220.

On the other hand, if it is determined that the motor generators 10, 20 are not currently rotating (NO in S220), the process proceeds to S226.

In S226, the ECU 300 executes the discharge control by using the first inverter 210, the second inverter 220, and the converter 205.

More specifically, the ECU 300 controls the first inverter 210 and the second inverter 220 such that the ECU 300 causes the current to flow in a direction of magnetic flux (a d-axis) that is formed in each of the motor generators 10, 20 and the rotors 610, 620, for example, and the electric power of the capacitor C2 is thereby consumed without the torque being output from the motor generators 10, 20. Note that the ECU 300 may discharge the electric charges stored in the capacitor C2 by switching loss of the first inverter 210 and the second inverter 220, for example.

Furthermore, as described above, the ECU 300 drives the transistors Q1, Q2 of the converter 205 to be ON/OFF and thereby discharges the electric charges stored in the capacitors C1, C2.

In S228, the ECU 300 determines whether the voltage VH is lower than the threshold A. If it is determined that the voltage VH is lower than the threshold A (YES in S228), the ECU 300 advances the process to S230. Note that, if it is determined that the voltage VH is equal to or higher than the threshold A (NO in S228), the ECU 300 returns the process to S228.

In S230, the ECU 300 executes the shutdown control in each of the first inverter 210, the second inverter 220, and the converter 205. That is, the ECU 300 brings the first inverter 210 into the gate blocking state by bringing the transistors Q3 to Q8 into the states. The ECU 300 brings the second inverter 220 into the gate blocking state by bringing the transistors Q9 to Q14 into the OFF states. Furthermore, the ECU 300 brings the converter 205 into the gate blocking state by bringing the transistors Q1, Q2 into the OFF states.

With such a configuration, in the case where none of the rotational speeds Nm1, Nm2 of the motor generators 10, 20 can be detected (NO in S208), the first discharge control (S210, S212, S214) is executed. Accordingly, without obtaining the rotational speeds Nm1, Nm2 of the motor generators 10, 20, the electric charges stored in the capacitors C1, C2 can be discharged while the rotational speeds of the motor generators 10, 20 are reduced.

On the other hand, even in the case where the collision of the vehicle 1 is detected (YES in S200), when at least one of the rotational speeds Nm1, Nm2 of the motor generators 10, 20 can be detected (YES in S208) and the motor generators 10, 20 are currently rotating (YES in S220), the three-phase ON control is executed in each of the first inverter 210 and the second inverter 220 (S222, S224). In this way, the torque is generated in the direction to inhibit the rotation in both of the motor generators 10, 20. Thus, the rotational speeds of the motor generators 10, 20 can be reduced. In addition, after the rotation of each of the motor generators 10, 20 is stopped (NO in S220), the discharge control by using the motor generators 10, 20 and the converter 205 is executed (S226). In this way, the discharge of the electric charges stored in the capacitors C1, C2 can promptly be completed.

Note that the description has been made that the control of discharging the electric charges of the capacitors C1, C2 by using the motor generators 10, 20 and the converter 205 is included as the second discharge control in the case where both of the motor generators 10, 20 are in the rotation stop states. However, for example, in the case where both of the motor generators 10, 20 are in the rotation stop states, the electric charges of the capacitors C1, C2 may be discharged by using at least one of the motor generators 10, 20 and the converter 205.

Note that the whole or parts of the above modified example may appropriately be combined for implementation. The embodiment that is disclosed herein should be considered as illustrative in all respects and not restrictive. The scope of the disclosure is indicated not by the above description but by the claims, and is intended to include all changes within a scope that has equivalent meaning to the claims and falls within the claims.

What is claimed is:

1. A hybrid vehicle comprising:
   an engine;
   a first rotary electric machine that has a permanent magnet in a rotor;
   an output shaft connected to a drive wheel;
   a planetary gear unit that mechanically couples the engine, the rotor of the first rotary electric machine, and the output shaft;
   a second rotary electric machine that is connected to the output shaft and has a permanent magnet in a rotor;
   a first inverter that is electrically connected to the first rotary electric machine, the first inverter including switching elements on an upper arm side of plural phases, switching elements on a lower arm side of the plural phases, and diodes that are respectively connected in reverse parallel to the switching elements;
   a second inverter that is electrically connected to the second rotary electric machine, the second inverter including switching elements on an upper arm side of plural phases, switching elements on a lower arm side of the plural phases, and diodes that are respectively connected in reverse parallel to the switching elements;
   a capacitor that is connected between a pair of direct current power lines of the first inverter and the second inverter;
   a discharge device configured to discharge electric charges of the capacitor;
   a collision detector configured to detect a collision of the hybrid vehicle; and
   an electronic control unit configured to execute first discharge control in a state where the engine is stopped in a case where the collision detector detects the collision of the hybrid vehicle, wherein
   the first discharge control includes bringing all of the switching elements on either one of the upper arm side and the lower arm side of one of the first inverter and the second inverter into ON states; bringing the other inverter of the first inverter and the second inverter into a gate blocking state in which all of the switching elements of the other inverter are in OFF states; and discharging the electric charges of the capacitor by using the discharge device until a voltage of the capacitor becomes lower than a threshold.

2. The hybrid vehicle according to claim 1 further comprising:
   a first detector configured to detect at least one of a rotational angle of the first rotary electric machine and a current flowing through the first rotary electric machine; and
   a second detector configured to detect at least one of a rotational angle of the second rotary electric machine and a current flowing through the second rotary electric machine, wherein
   the electronic control unit is: configured to execute the first discharge control in the case where the collision of the hybrid vehicle is detected and when none of a rotational speed of the first rotary electric machine and a rotational speed of the second rotary electric machine can be detected by using the first detector and the second detector; and configured to execute second discharge control when at least one of the rotational speed of the first rotary electric machine and the rotational speed of the second rotary electric machine can be detected by using the first detector and the second detector even in the case where the collision of the hybrid vehicle is detected, and
   the second discharge control includes: bringing all of the switching elements on either one of the upper arm side and the lower arm side in each of the first inverter and the second inverter into the ON states; and discharging the electric charges of the capacitor by using at least one of the first rotary electric machine, the second rotary electric machine, and the discharge device when both of the first rotary electric machine and the second rotary electric machine are in rotation stop states.

3. The hybrid vehicle according to claim 2, wherein
   the first detector includes a first resolver and a first current detector that detects a phase current of the first rotary electric machine,
   the second detector includes a second resolver and a second current detector that detects a phase current of the second rotary electric machine, and
   the electronic control unit is configured to determine whether the first resolver, the first current detector, the second resolver, and the second current detector malfunction, and determine that the rotational speed of the first rotary electric machine and the rotational speed of the second rotary electric machine cannot be detected when all thereof malfunction.

4. The hybrid vehicle according to claim 1 further comprising:
   a converter that is connected to the pair of direct current power lines of the first inverter and the second inverter; and a power storage device that transmits electric power to the converter and receives electric power from the converter, wherein the electronic control unit is configured to execute the first discharge control by using the converter as the discharge device in the state where the engine is stopped in the case where the collision of the hybrid vehicle is detected.

5. The hybrid vehicle according to claim 1, wherein the discharge device includes: a resistor body that is connected in parallel to the capacitor; and a switch that switches a route through the resistor body between a conductive state and a blocking state.

6. A control method of a hybrid vehicle including: an engine; a first rotary electric machine that has a permanent magnet in a rotor; an output shaft connected to a drive wheel; a planetary gear unit that mechanically couples the engine, the rotor of the first rotary electric machine, and the output shaft; a second rotary electric machine that is connected to the output shaft and has a permanent magnet in a rotor; a first inverter that is electrically connected to the first rotary electric machine, the first inverter including switching elements on an upper arm side of plural phases, switching elements on a lower arm side of the plural phases, and diodes that are respectively connected in reverse parallel to the switching elements; a second inverter electrically connected to the second rotary electric machine, the second inverter including switching elements on an upper arm side of plural phases, switching elements on a lower arm side of the plural phases, and diodes that are respectively connected in reverse parallel to the switching elements; a capacitor that is connected between a pair of direct current power lines of the first inverter and the second inverter; a discharge device that is configured to discharge electric charges of the capacitor; and a collision detector that detects a collision of the hybrid vehicle, the control method comprising:

detecting presence or absence of the collision of the hybrid vehicle by the collision detector; and stopping the engine and executing first discharge control in a case where the collision is detected, wherein the first discharge control includes:

turning ON all of the switching elements on either one of the upper arm side and the lower arm side in one of the first inverter and the second inverter;

subjecting the other inverter of the first inverter and the second inverter to gate blocking such that all of the switching elements of the other inverter are in OFF states; and discharging the electric charges of the capacitor by using the discharge device until a voltage of the capacitor becomes lower than a threshold.

7. The control method according to claim 6, the hybrid vehicle further including: a first detector that detects at least one of a rotational angle of the first rotary electric machine and a current flowing through the first rotary electric machine; and a second detector that detects at least one of a rotational angle of the second rotary electric machine and a current flowing through the second rotary electric machine, the control method further comprising:

executing the first discharge control in the case where the collision of the hybrid vehicle is detected and when none of a rotational speed of the first rotary electric machine and a rotational speed of the second rotary electric machine can be detected; and executing second discharge control in the case where the collision of the hybrid vehicle is detected and when at least one of the rotational speed of the first rotary electric machine and the rotational speed of the second rotary electric machine can be detected, the second discharge control including:

bringing all of the switching elements on either one of the upper arm side and the lower arm side of each of the first inverter and the second inverter into ON states; and discharging the electric charges of the capacitor by using at least one of the first rotary electric machine, the second rotary electric machine, and the discharge device when both of the first rotary electric machine and the second rotary electric machine stop rotating.

* * * * *

UNITED STATES PATENT AND TRADEMARK OFFICE
CERTIFICATE OF CORRECTION

PATENT NO. : 9,969,269 B2
APPLICATION NO. : 15/444670
DATED : May 15, 2018
INVENTOR(S) : Atsushi Nomura and Tomoko Oba It is certified that error appears in the above-identified patent and that said Letters Patent is hereby corrected as shown below:

In the Specification

In Column 4, Line 5, delete "machine" and insert --machine,--, therefor.

In Column 8, Line 54, after "generator", delete "10:" and insert --10.--, therefor.

In Column 13, Line 53, after "can", insert --be generated--.

Signed and Sealed this
Twenty-sixth Day of June, 2018

Andrei Iancu
*Director of the United States Patent and Trademark Office*